United States Patent

[11] 3,597,080

[72] Inventors Donald P. Gush
Hyattsville;
Manuel C. Uy, Glen Burnie; Einstein E. Caicedo, Silver Spring, all of, Md.

[21] Appl. No. 770,603
[22] Filed Oct. 25, 1968
[45] Patented Aug. 3, 1971
[73] Assignee W. R. Grace & Co.
New York, N.Y.
Continuation-in-part of application Ser. No. 674,772, Oct. 12, 1967, now Patent No. 3,520,606

[54] APPARATUS FOR PREPARING A PRINTING PLATE FROM A PHOTOSENSITIVE COMPOSITION
15 Claims, 14 Drawing Figs.

[52] U.S. Cl. 355/85, 95/89
[51] Int. Cl. G03b 27/30
[50] Field of Search 355/93, 91, 85; 95/89; 96/35.1

[56] References Cited
UNITED STATES PATENTS

| | | | |
|---|---|---|---|
| 2,257,581 | 9/1941 | Ulsheimer | 355/93 |
| 2,989,911 | 6/1961 | Winnek | 95/89 |
| 3,371,651 | 3/1968 | Johnson et al. | 95/89 |
| 3,407,786 | 10/1968 | Beyer et al. | 95/89 |
| 3,520,606 | 7/1970 | Gush et al. | 355/85 |

*Primary Examiner*—Samuel S. Matthews
*Assistant Examiner*—T. A. Mauro
*Attorneys*—Eugene M. Bond and Kenneth E. Prince

ABSTRACT: The disclosed invention is for a photocomposing apparatus and improvements in a method of operating a photocomposing apparatus. The apparatus includes a housing having at one end an actinic light source and at the other end a support adapted to receive thereon a liquid photocurable composition which on exposure to actinic light through an image bearing transparency becomes selectively insolubilized in the exposed portions thereof. The invention is especially useful in preparing a developable printing plate from a liquid photocurable composition.

INVENTORS
DONALD P. GUSH
MANUEL C. UY
EINSTEIN E. CAICEDO
BY
Eugene W. Bond
ATTORNEY INVENTORS
DONALD P. GUSH
MANUEL C. UY
EINSTEIN E. CAICEDO
BY
Eugene M. Bond
ATTORNEY INVENTORS
DONALD P. GUSH
MANUEL C. UY
EINSTEIN E. CAICEDO
BY
Eugene W. Bond
ATTORNEY

INVENTORS
DONALD P. GUSH
MANUEL C. UY
EINSTEIN E. CAICEDO
BY

Eugene Lee Bond
ATTORNEY

INVENTORS
DONALD P. GUSH
MANUEL C. UY
EINSTEIN E. CAICEDO
BY
Eugene M. Bond
ATTORNEY INVENTORS
DONALD P. GUSH
MANUEL C. UY
EINSTEIN E. CAICEDO
BY
Eugene W. Bond
ATTORNEY INVENTORS
DONALD P. GUSH
MANUEL C. UY
EINSTEIN E. CAICEDO
BY
Eugene W. Bond
ATTORNEY INVENTORS
DONALD P. GUSH
MANUEL C. UY
EINSTEIN E. CAICEDO
BY
Eugene W. Bond
ATTORNEY INVENTORS
DONALD P. GUSH
MANUEL C. UY
EINSTEIN E. CAICEDO
BY
Eugene W. Bond
ATTORNEY INVENTORS
DONALD P. GUSH
MANUEL C. UY
EINSTEIN E. CAICEDO
BY
Eugene W. Bond
ATTORNEY

APPARATUS FOR PREPARING A PRINTING PLATE FROM A PHOTOSENSITIVE COMPOSITION

This application for U.S. Letters Patent is a continuation-in-part of application Ser. No. 674,772 filed Oct. 12, 1967, and now U.S. Pat. No. 3,520,606.

This invention relates to a photocomposing apparatus and improvements in a method of operating a photocomposing apparatus. More particularly, the present invention relates to a photocomposing apparatus having a housing or frame with an actinic light source disposed at one end thereof and at the other end a support adapted to receive thereon a liquid photocurable composition which on exposure to actinic light through an image bearing transparency becomes selectively insolubilized in the exposed portions thereof.

Numerous devices are available in the prior art which are useful for photocomposing. However, where accurate placement of images in a predetermined relative position over a liquid photocurable composition for accurate duplication of the images is required, devices available to the art have not proved commercially practical. Typically, the prior art devices have been complex and have had limited ability to permit exacting duplication in photocomposing with maximum efficiency. In most instances, devices available to the art require extensive manual operations which further limit the efficiency and accuracy of duplication with human error and skill a constant dependent factor. It has now been found that by the practice of the present invention, a photocomposing apparatus and method are provided which overcome many of the defects of prior art devices, and permit exacting photocomposing which may be repeated with maximum efficiency. The present invention thus provides for photocomposing with a high degree of accuracy and wherein critical operations are performed substantially automatically. The apparatus and method disclosed herein are not only commercially practical but also are highly reliable in routine operation by even semiskilled operators.

Broadly stated, the apparatus of the present invention provides a frame or housing adapted to support at one end thereof an actinic light source and at the other end a platform adapted to receive thereon a photocurable composition dispensed by a regulated dispenser and layered thereon in a substantially uniform thickness. Upon exposure of the photocurable composition to actinic light projected through an image bearing transparency, the composition becomes selectively insolubilizes in the exposed portions thereof and remains substantially liquid in the nonexposed portions thereof. A transparency film holder is included having a substantially flat face adjacent to the image bearing transparency which is supported thereagainst. The liquid photocurable composition is desirably applied as a substantially uniform layer to a support film positioned over the platform. The composition may be received from a continuously recirculating supply to maintain uniformity in the consistency of the liquid photocurable composition.

The method of the present invention generally provides, for photocomposing, the steps of mounting an image bearing transparency film on a support preferably transparent, applying a nonuniform layer of liquid photocurable composition to a support surface, leveling the applied liquid photocurable composition to a substantially uniform thickness over said support surface, positioning the mounted transparency in a predetermined position over the substantially uniform thickness of liquid photocurable composition, and exposing the liquid photocurable composition to actinic radiation projected through the image bearing transparency to selectively photocure the liquid composition in image-bearing areas with the nonexposed composition portions remaining substantially liquid and removable as desired. The liquid photocurable composition is applied to the support surface by a substantially automated applicator which includes means for applying a liquid photocurable composition to the support surface and means for leveling the applied composition such to provide a substantially uniform thickness of composition over the support surface. An air blower for directing heated air against the applied liquid photocurable composition may be includes to further facilitate the leveling operation and to provide a layer of composition substantially free of any air bubbles which may be entrapped by the composition such as during application to the support surface. In one embodiment of the present method, the liquid photocurable composition is recycled to retain a substantially uniform supply and the supply is maintained at a constant temperature, and under vacuum to remove any gases which may become entrapped therein.

Although it is recognized that the apparatus and method of the present invention may be used to prepare numerous products of photocurable compositions, this invention will be hereinafter described with regard to the graphic arts and in particular to preparation of a printing plate of a photocurable liquid composition.

Relief printing plates have been made of zinc or magnesium metal by photoengraving methods. In photoengraving, a metal surface is coated with a very thin layer of a photosensitive resist composition which is exposed to light through an image-bearing transparency and a reverse image is formed in the photosensitive layer on the metal surface. The unexposed portion of the thin photosensitive layer is then removed by washing, leaving a relief image of the desired image on the metal surface. The relief image is of insufficient depth for printing use and etching, usually with nitric acid, of the metal surface in the unexposed areas is required to render the plate usable commercially.

Photoengraved plates usually require re-etching operations to delineate between the printing and nonprinting areas. In addition, the press life of these plates is usually not of sufficient duration for many large scale printing operations, thus necessitating replication or duplication of the plates, application of more durable coatings, such as chromium metal, and the like. Since replication is difficult because of the nonuniformity of control in the etching process, duplicating methods such as stereotyping or electrotyping are usually employed. However, disadvantages remain, for example, in the electrotyping method in that duplicate plates prepared thereby are usually nonuniform in relief height, thus necessitating additional work to obtain a plate of uniform height.

Recently, solid polymeric materials such as "Dycril" by E. I. duPont de Nemours & Co. or "KRP" by Eastman Kodak Co. have been substituted for metals in the formation of printing plates. Images are formed by photopolymerization and thereafter, a period of time is necessary to develop the plate in a solvent or an aqueous caustic system.

Typically, preparation of printing plates has required intimate contact between a negative or image bearing transparency and the surface forming the printing plate. Great skill is usually required to prepare printing plates by such contact methods and especially in instances when the printing plate is formed of a photocurable composition. It has been found that by the practice of the present invention printing plates formed of a supported liquid photocurable composition may be prepared simply, in short time, and with commercial acceptability. The present plates may include relief images of uniform printing height suitable for either direct or indirect use as a printing plate. Printing plates may be thus prepared rapidly and at uniform relief by applying a layer of a liquid photocurable composition to one surface of a solid flexible support having a thickness of about 2 to about 50 mils and being in a substantially flat position, adjusting the thickness of the photocurable composition to obtain a substantially uniform thickness in the range of about 3 to about 250 mils, on said support surface, exposing the photocurable composition to actinic radiation through an image bearing, line or halftone, positive or negative transparency consisting solely of opaque and substantially transparent areas wherein the opaque areas are substantially of the same optical density, said transparency being maintained substantially parallel to the layer of the composition with a surface having the static electrical charge substantially eliminated and with an air gap therebetween of about 1 to about 100 mils until substantially complete solidification of the liquid composition takes place in the exposed areas and essentially no solidification takes place in the unexposed areas, and thereafter removing the liquid photocurable composition in the unexposed areas. Desirably, the unexposed areas are removed by means of an aqueous or solvent bath and in one embodiment the bath may be energized by ultrasonic energy to an ultrasonic energy level in the range of about 18 to about 40 kilocycles/sec.

Practice of the present invention will become more apparent from the following detailed description taken in connection with the accompanying drawings wherein.

Figures 2, 3:
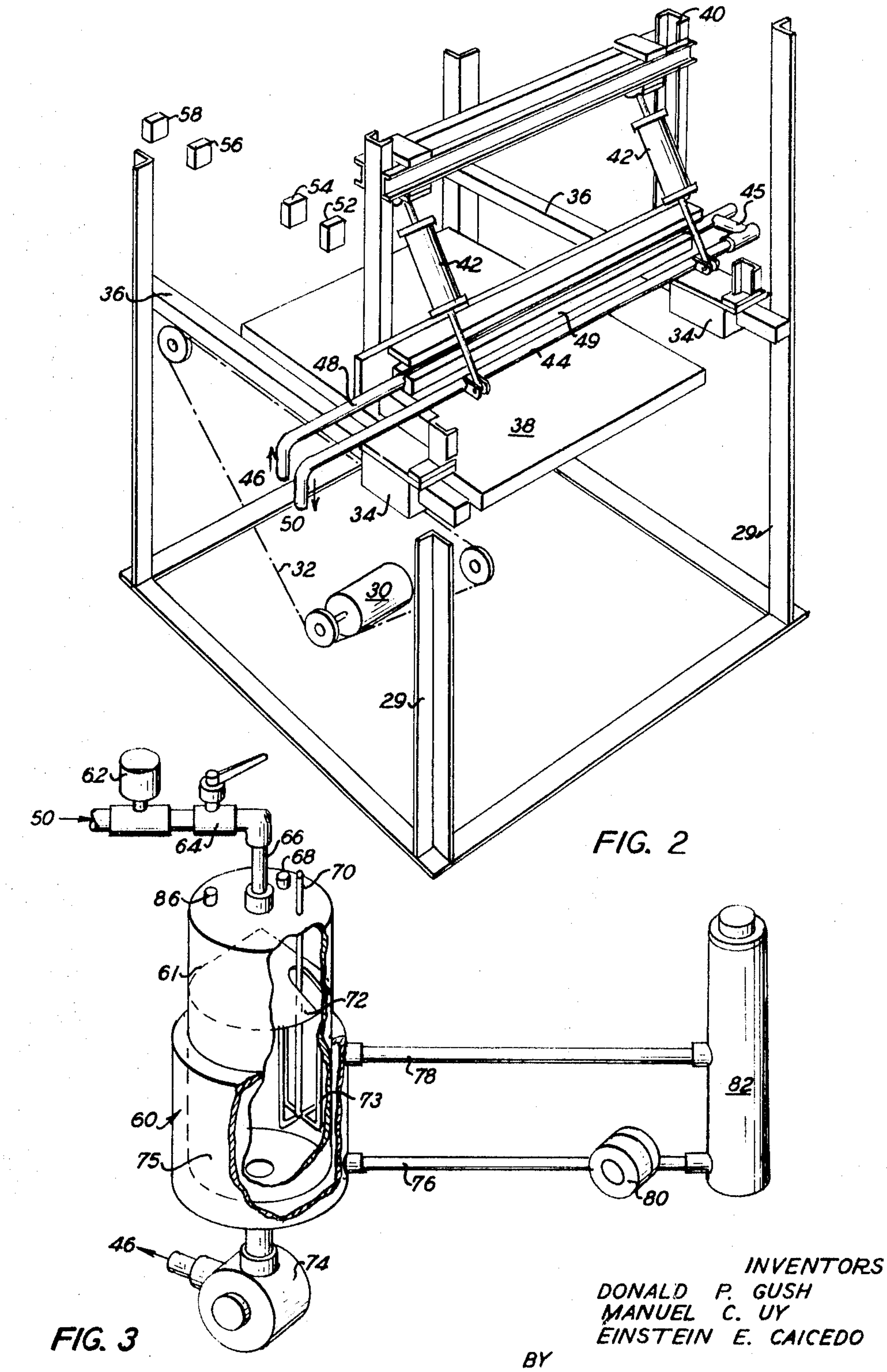
FIG. 2 is a partial rear perspective view taken opposite that of FIG. 1 and generally illustrating the relative locations of elements symbolically shown for the apparatus of this invention.
Figure 4:
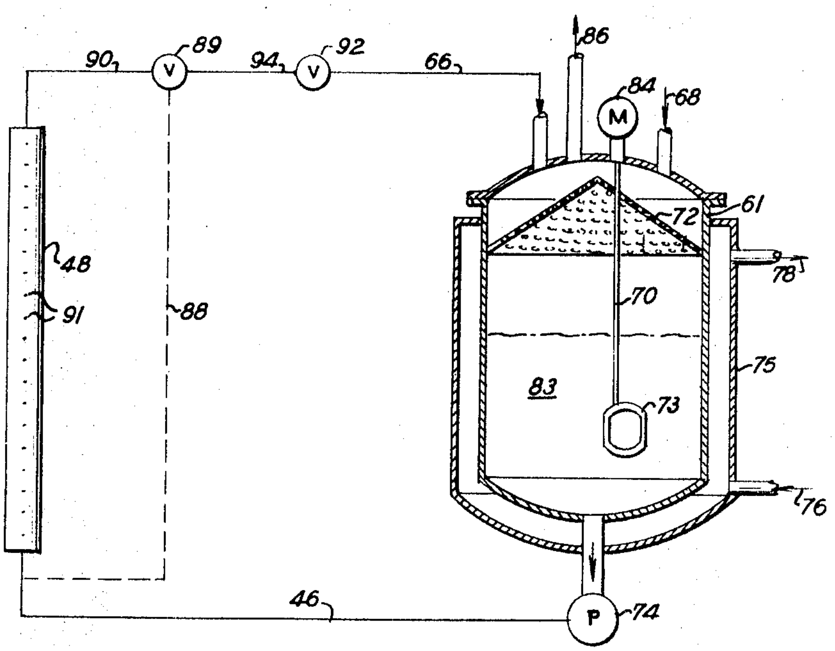
Figure 5:
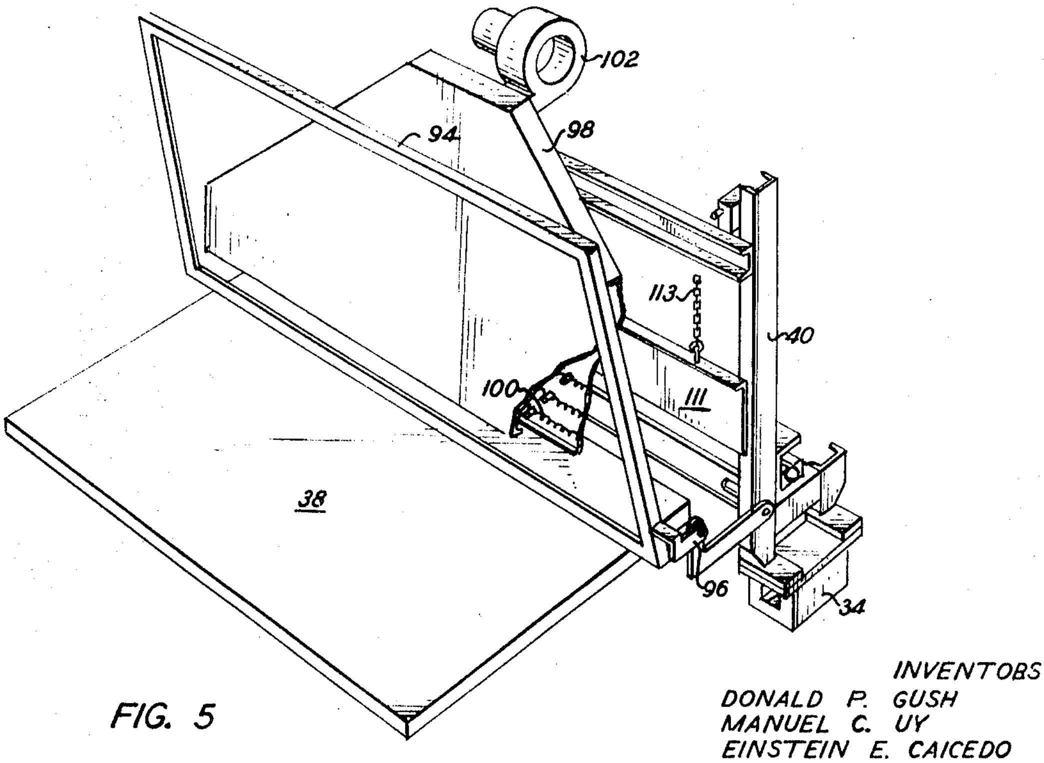
Figures 6, 7:
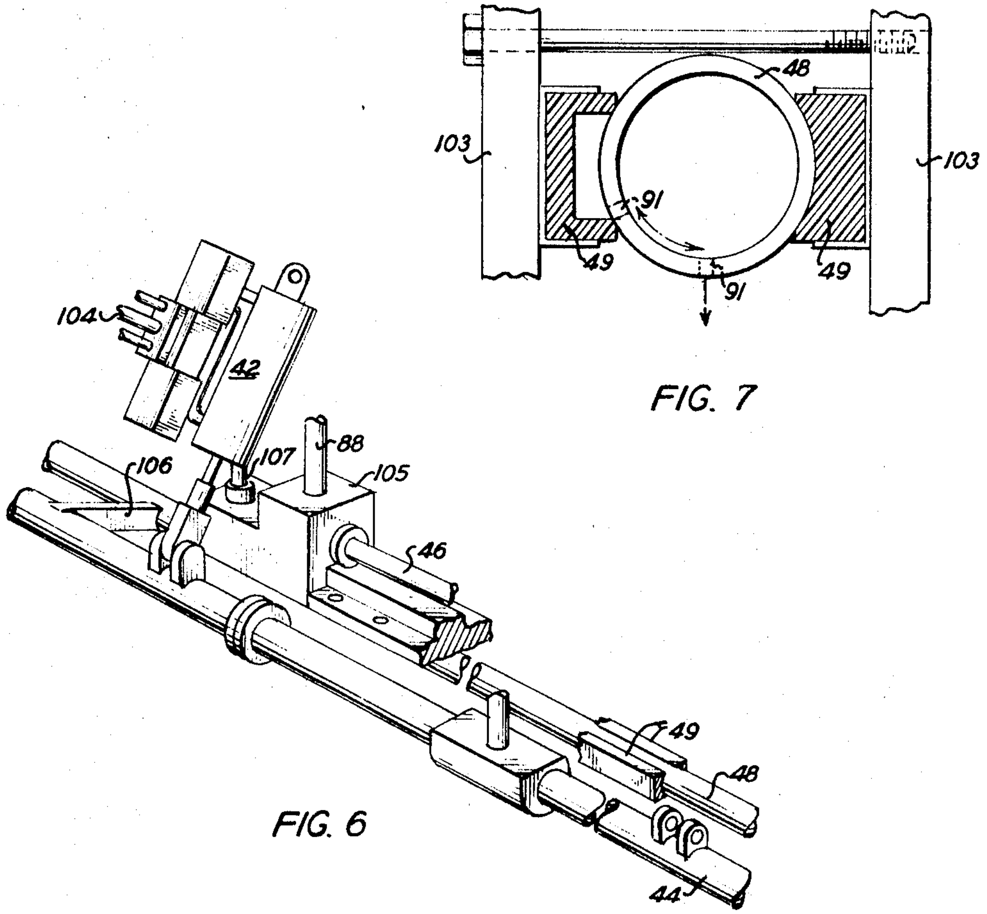
Figure 8:
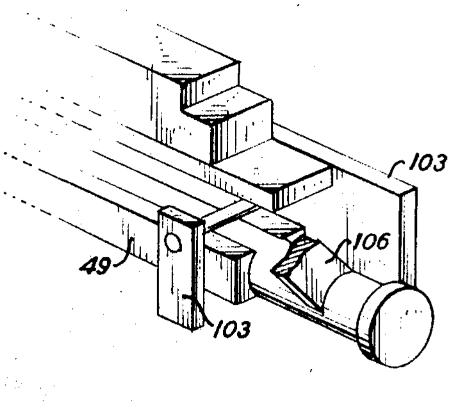
Figure 9:
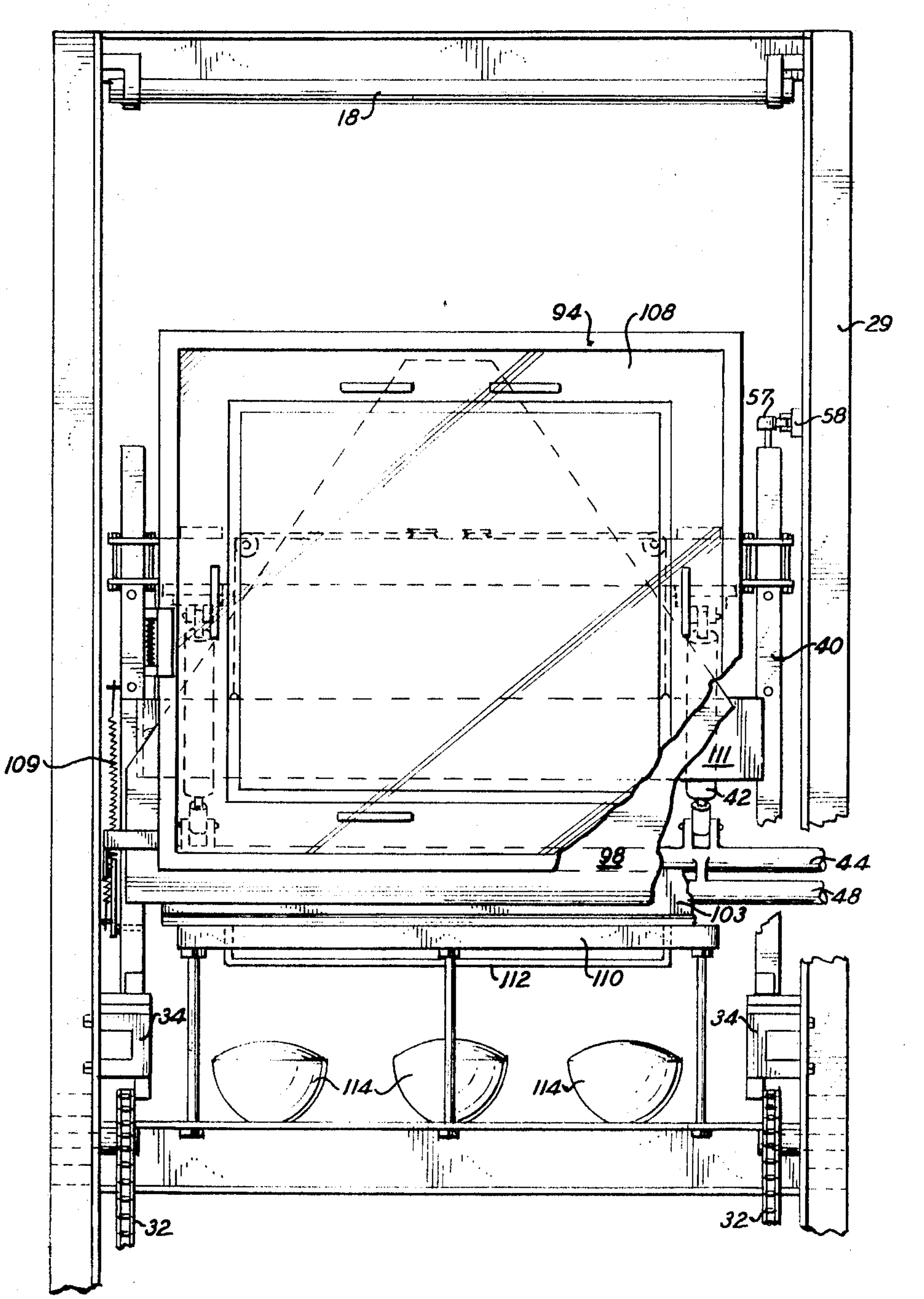
Figure 10:
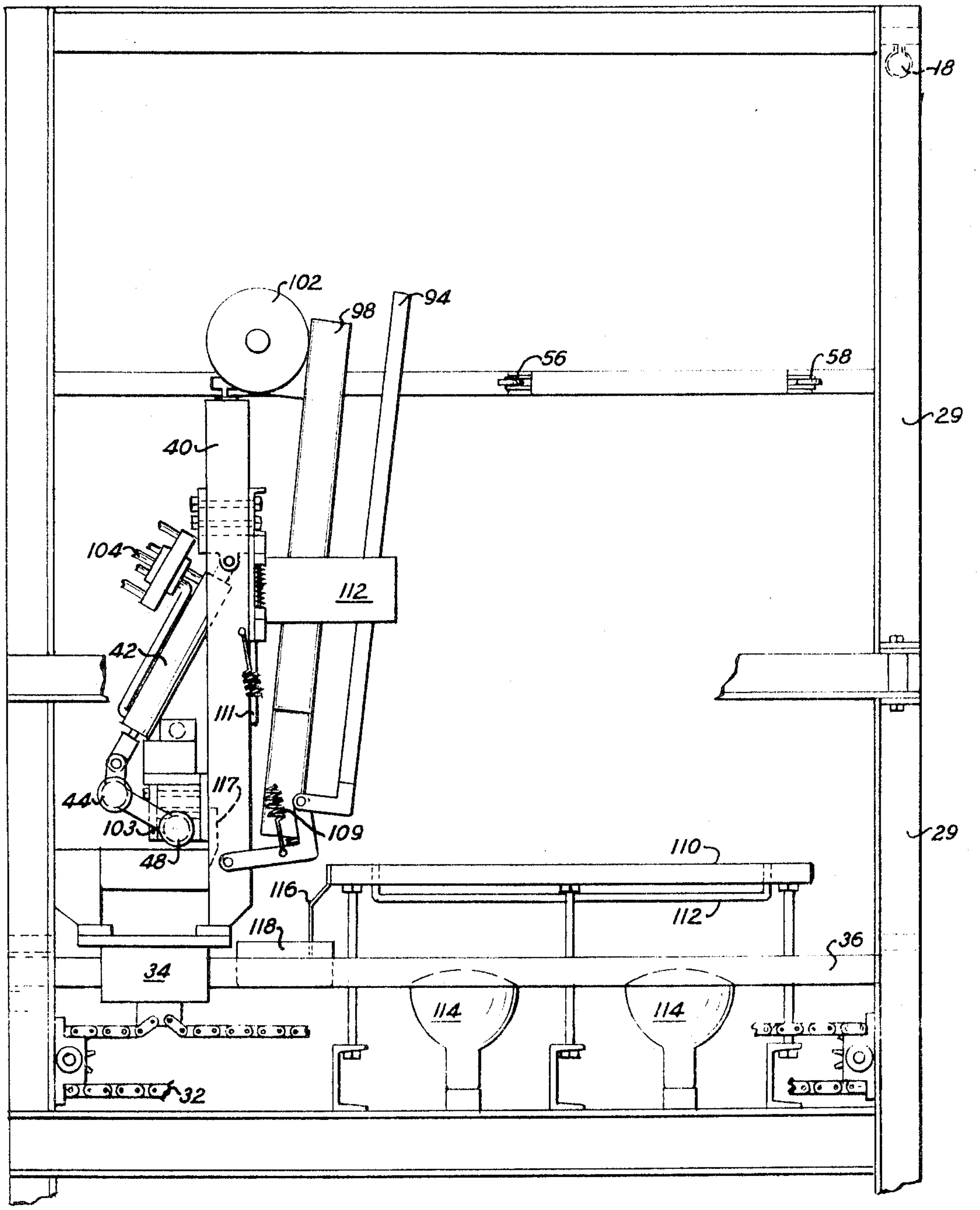
Figure 11:
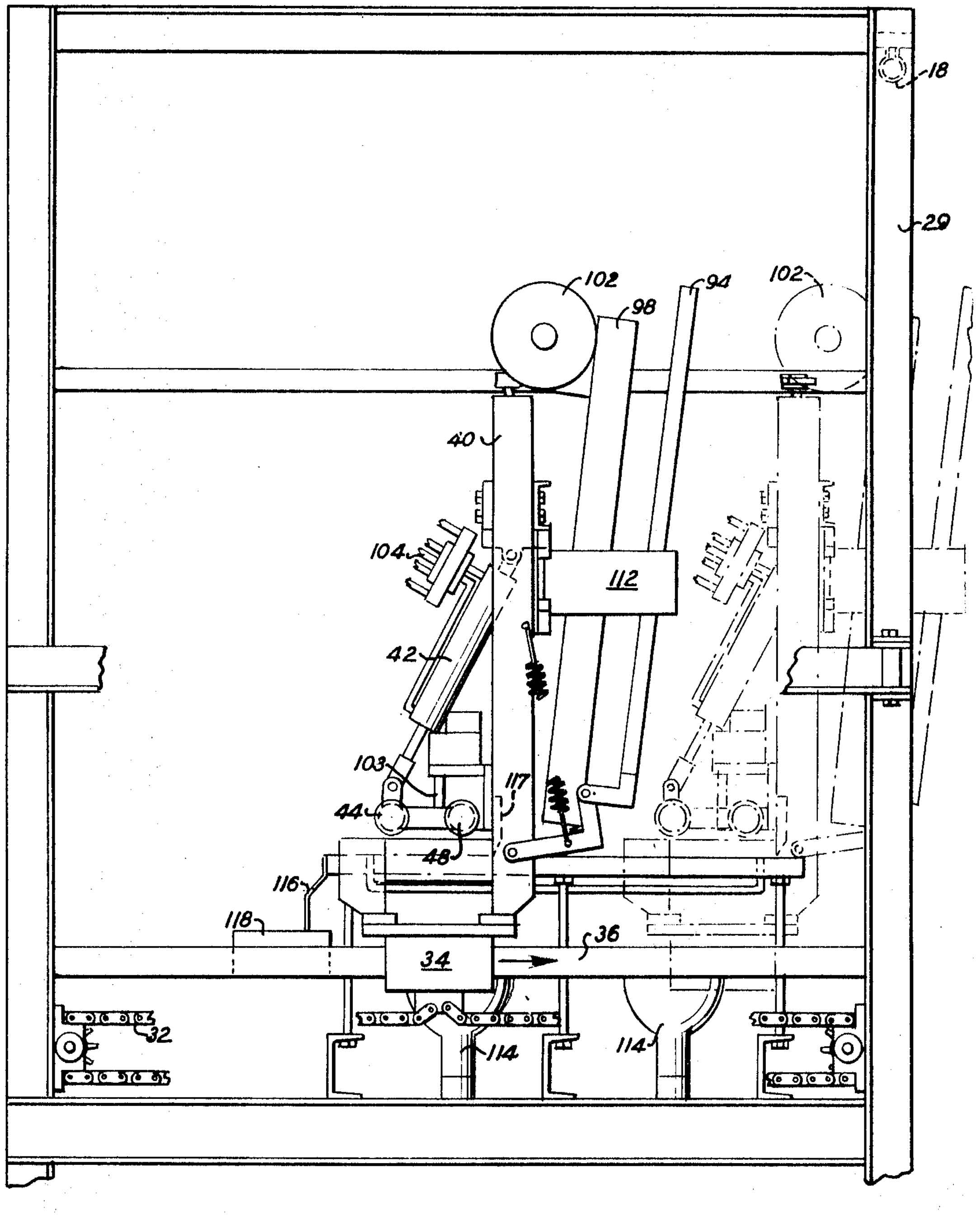
Figure 12:
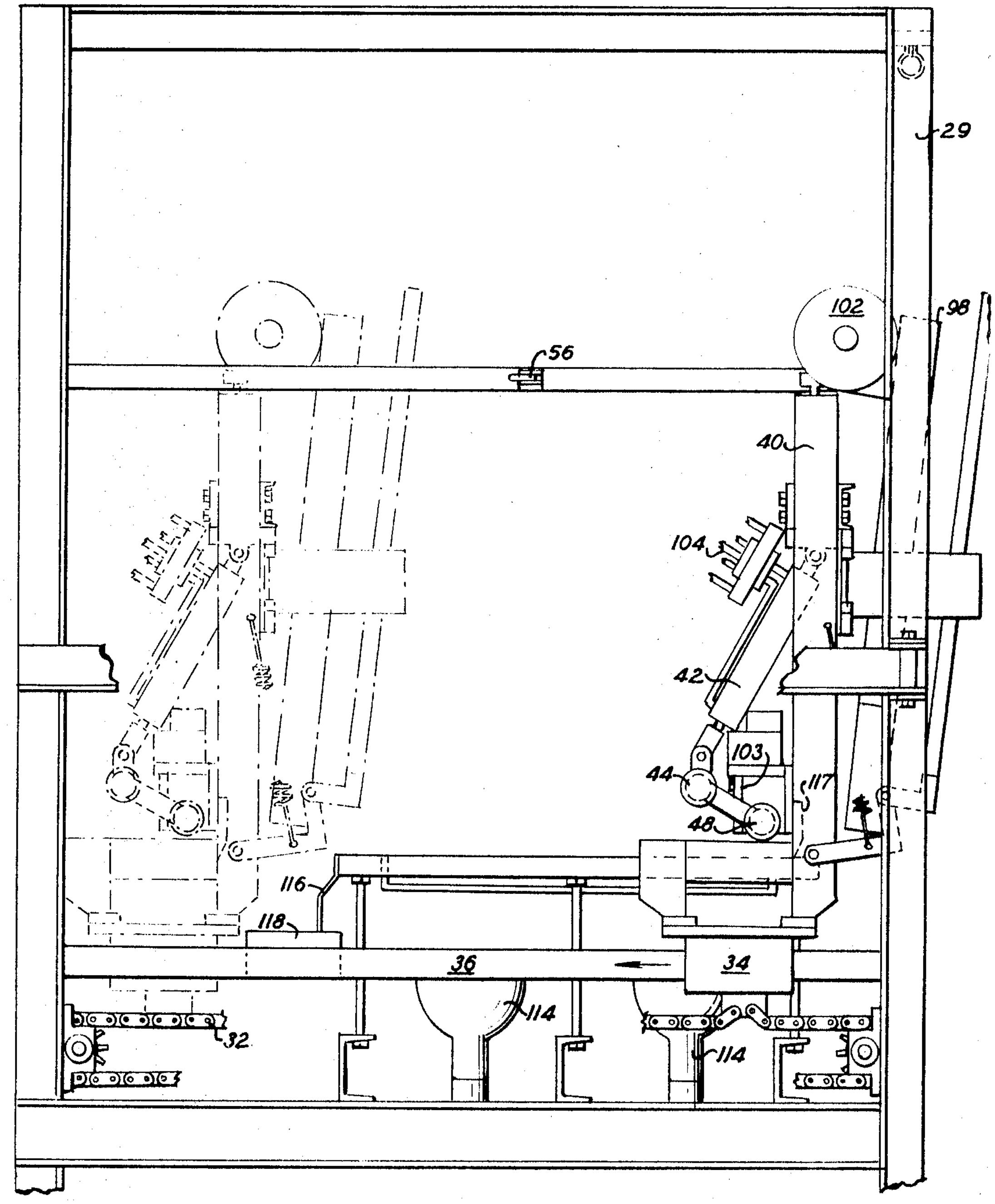
Figure 13:
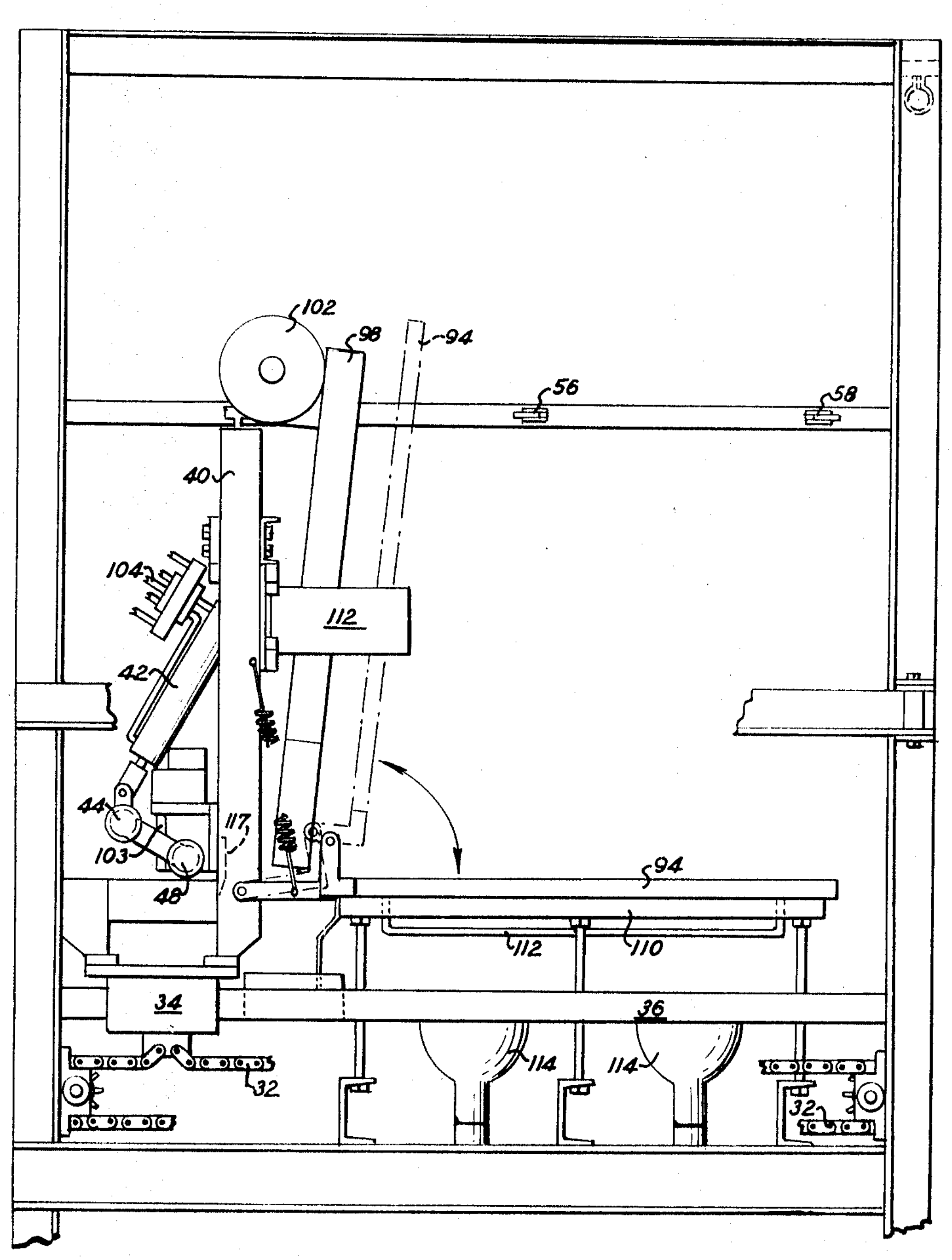
Figure 14:
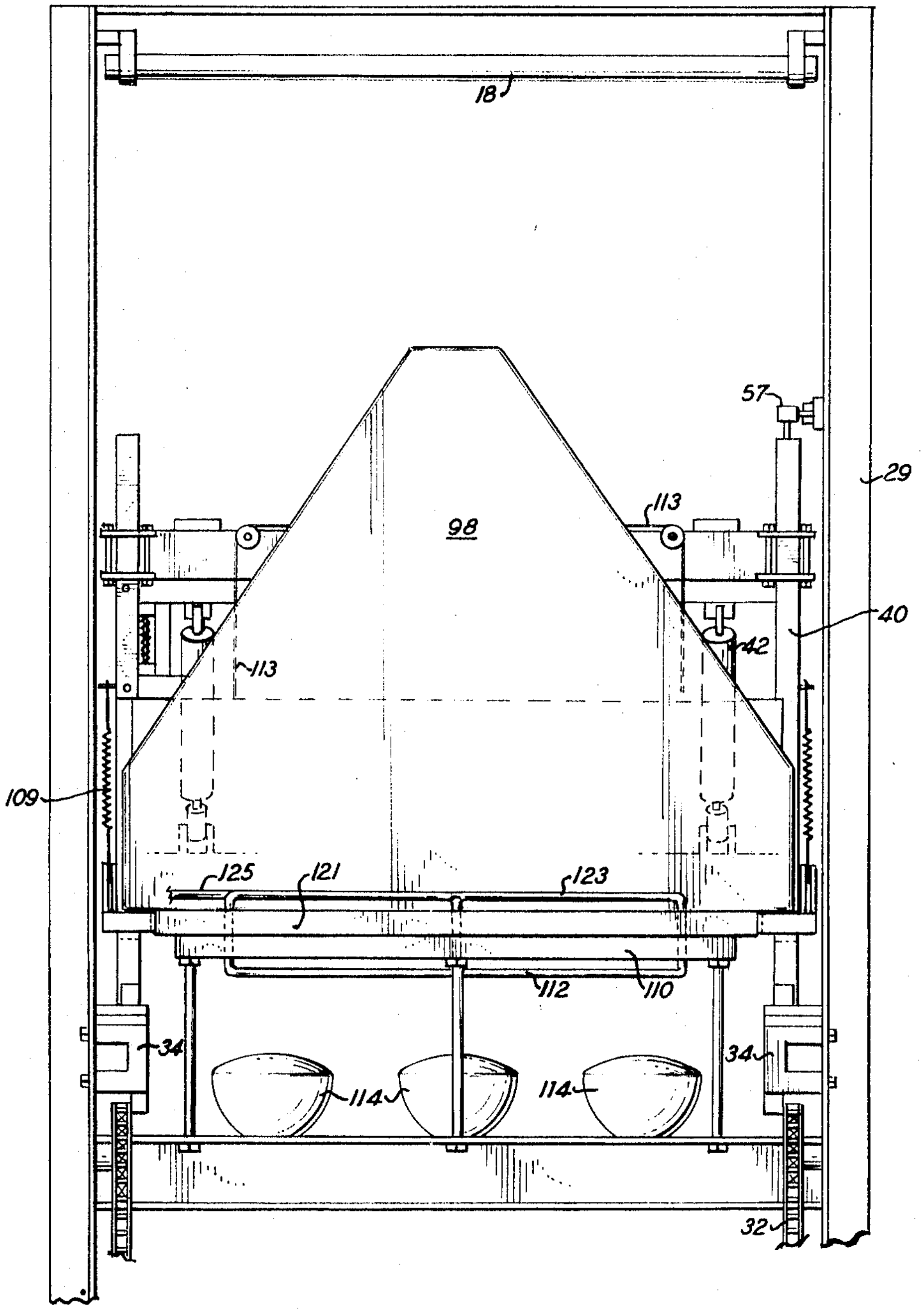

FIG. 3 further complements FIG. 2 and illustrates, in perspective, a portion of the liquid photocurable composition system used in the present apparatus;

FIG. 4 illustrates as a general diagram the liquid photocurable composition system;

FIG. 5 illustrates as a perspective view, a carriage including a mounting element for supporting a transparent holder for a transparency film in relative position over a platen or support surface and in association with an air unit;

FIG. 6 shows as a partial perspective view a liquid photocurable composition dispenser means;

FIG. 7 shows further as a partial side elevational view a liquid photocurable composition dispenser;

FIG. 8 shows as a partial end perspective view a liquid photocurable composition dispenser;

FIG. 9 illustrates a partial front elevational view of the apparatus of the present invention;

FIG. 10 is a partial side elevational view illustrating the normal position of the elements at a first position;

FIG. 11 is a partial side elevational view illustrating the position of the elements during dispensing of the liquid photocurable composition;

FIG. 12 is a partial side elevational view illustrating the position of the elements subsequent to dispensing and preparatory to leveling of the dispensed liquid photocurable composition;

FIG. 13 is a partial side elevational view illustrating the position of the elements for exposure of the liquid photocurable composition by actinic light projected through a transparency positioned on a support; and FIG. 14 shows a partial front view during exposure.

Figure 1:
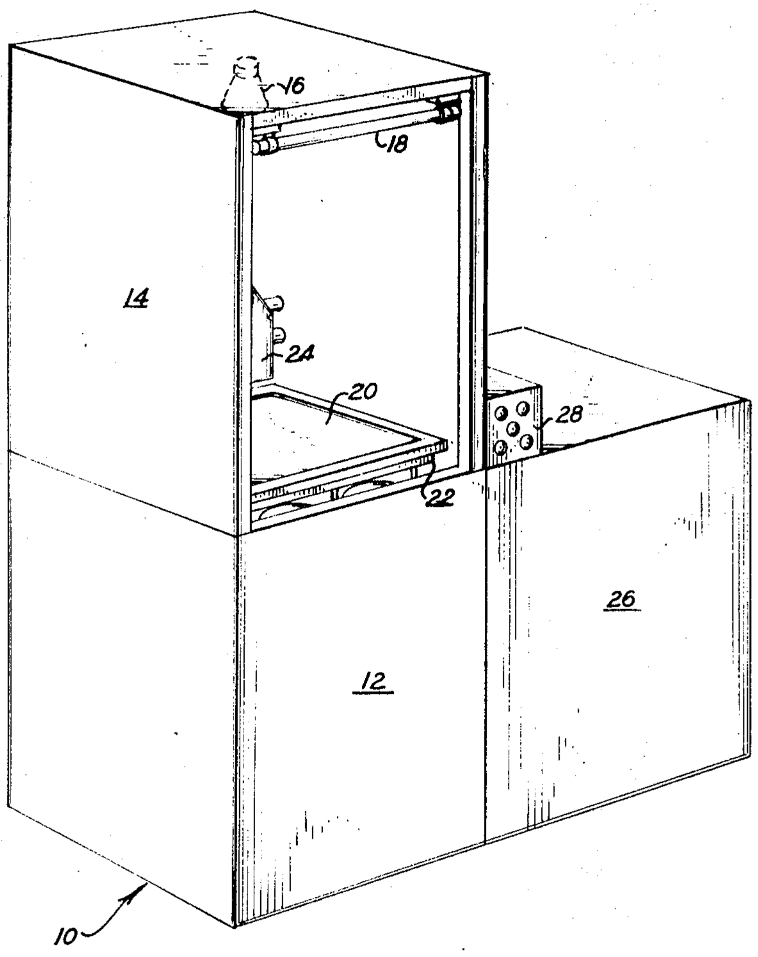
FIG. 1 is a front perspective view generally illustrating the apparatus of the present invention.

Referring to the drawings wherein similar elements are referred to by similar numerals throughout the several views, FIG. 1 illustrates photocomposing apparatus 10 having base compartment 12 and upper compartment 14. Disposed within upper compartment 14 is actinic light source 16 and, if desired, means 18 for generating ions for elimination of electrostatic electricity charges within the upper compartment. The actinic light source is located within a hemispherical reflective unit to direct the rays of light. The actinic light source is connected to a power source not shown. Disposed near the bottom of compartment 14 is substantially transparent mounting plate 20 for mounting a transparency over a support surface or platen 22. Housing 24 provides an air chamber for directing heated air against the support surface.

The lower compartment 12 may include various elements required for operation of the apparatus of the present invention as will be described in greater detail hereafter. Disposed adjacent compartment 12 is housing 26 which may usefully store a liquid photocurable composition system and may also support, if desired, control panel 28 which electronically operates the various elements hereinafter described.

FIG. 2 illustrates as a partial rear perspective view various elements of the apparatus of the present invention. The apparatus may include frame network 29 about which the various elements may be mounted in working association relative to each other. Motor 30 is included within lower compartment 12 and drives chain or belt 32 about provided pulleys for positioning carriage slides 34 on railing 36 relative to support layer of platen 38. Carriage 40 may include air operated pistons 42 which pivot tubing 44 relative to tubing 48 dispensing a liquid photocurable composition received into dispensing a liquid photocurable composition received into dispenser tubing 48 as illustrated by direction arrow 46 such that the composition flows through connector 45 and into tubing 44 with return indicated by arrow 50. Dispenser tubing 48 may be rotated for dispensing as will be described hereinafter within dispenser housing 49. Switches 52, 54, 56 and 58 may be included in relative position for activation by contact with an element of carriage 40 for initiating dispensing of a liquid photocurable composition, for terminating the dispensing thereof; and for initiating operation of the air blower and for terminating the activation thereof. The switches may be incorporated in any desired fashion and in any desired number provided that an on-off effect is maintained for activation of both the liquid dispensing and heated air units.

FIG. 3 illustrates as a partial perspective view the liquid photocurable composition system for use in association with the elements described relative to FIG. 2. The system of FIG. 3 includes a composition storage tank 60 having storage compartment 61 into which may flow, as indicated by direction arrow 50 a liquid photocurable composition. Suitable valve 62 such as one operated by a solenoid electrical arrangement may be included in line 66 and may be further complemented, if desired, by manual valve 64. The liquid composition is received into the storage tank through line 66 and may be resupplied from time to time through a suitable port 68 to make up the amount of liquid composition dispensed. Stirrer 70 may be also included having stirring elements 73 for continuously agitating the stored liquid photocurable composition to maintain a substantially uniform composition as well as for removing any entrapped air or gas in the composition. It is generally found that entrapped gases will disadvantageously affect formation of, for example, printing plates in that the gas bubbles may provide a pocked surface which proves undesirable during printing with such plates. In order to further limit entrapment of air, cone 72 is provided such that returning liquid composition from line 66 is permitted to flow down the cone system and avoid entrapping air during free fall in the absence of such a cone system. Thus, stirring rod 70 with stirring elements 73 and cone element 72 usefully provide means for restricting entrapment of air or other gas bubbles within the liquid photocurable composition. The system is further complemented by providing a vacuum within the storage vessel. The vacuum may be maintained through line 86 or otherwise as desired to remove any air or gases from the liquid system.

To further limit entrapment of air of gas bubbles within the liquid composition and to further provide a liquid system which readily flows through the elements of the system, jacketed heater 75 may be included about chamber 61 for maintaining the stored photocurable composition at a temperature such that the composition is readily fluid. Heat may be supplied within jacketed chamber 75 by a heat transfer fluid including water received through lines 76 and 78 by pump 80 from heat source 82. Heat source 82 may be any heat generating unit with heat developed by electricity, gas, a simple heat transfer system receiving heat from another source or the like as may be desired.

Liquid photocurable composition within chamber 61 may be transferred to dispensing line 48 in the direction of arrow 46 by pump 74. Desirably, pump 74 is a positive displacement pump to further limit entrapment of air within the photocurable composition and provide a constant pressure in the system for dispensing.

The liquid photocurable composition dispensing system is further illustrated in FIG. 4 wherein pump 74 is generally shown receiving liquid photocurable composition 83 from within chamber 61 and passing same through line 46 to dispenser 48 having a series of dispensing slots or nozzles 91 positioned thereon. During the dispensing operation, the liquid composition is received through line 46 and passes into dispenser 48. During the nondispensing periods, liquid composition may be received in line 46 and passed through nondispensing path 88 of dispenser 48 when valve 89 is closed to terminate dispensing. The liquid composition thus passes through dispenser 48 and returns to line 94 where the recycle flow rate may be regulated by valve 92 as desired. The liquid composition is received through line 66 and returns into chamber 61 by passing down cone 72 thus limiting the opportunity for entrapment of gasses or air within the liquid composition on its return to the storage area. The composition may be agitated by stirring rod 70 and stirrer 73 operated by any suitable motor 84 or related means. Vacuum may be maintained within the system by line 86 receiving vacuum generated from a suitable means conventionally known to the art.

The liquid composition may be added to the storage tank through line 68 from time to time as may be necessary to maintain a supply of liquid composition in the system. Although not illustrated, it is recognized that line 68 is closed during operation periods to retain vacuum in the system. The composition may be maintained heated by jacket 75 about chamber 61 with a heat transfer fluid received through line 76 and passing through line 78 as described herein before.

FIG. 5 illustrates the various elements associated with carriage 40 of the present invention which is positioned relative to surface layer 38. Carriage 40 may include frame 94 wherein may be mounted a transparent plate to which may be adhered a transparency.

Numerous means are available for retaining a transparency film such as a photographic negative to the transparent plate. These means include support plates whereon the film is merely layered over a transparent plate, support plates having clamping means to hold the film physically to the plate member, as well as other related means such as lamination of a film between adjoining plates. A transparent plate having a channeled area removed from one surface in combination with vacuum transport means usefully serves to provide a device for retaining a transparency thereover and is preferred for use herein. The transparent plate for mounting a transparency film may include a transparent foundation plate having a channeled section removed from a substantially flat surface thereof and forming a periphery thereon. Vacuum transport means passing through the plate to the removed channeled section may be interconnected to a vacuum source. The transparency film may then be retained by the vacuum in the channeled section to the flat surface of the plate and light may be projected therethrough for exposure of a liquid photocurable composition.

Frame 94 may be pivotally mounted about any suitable pivotable bracket means 96 for moving into and from exposing position relative to a liquid photocurable composition position on surface layer 38. Rail block 34 may support carriage 40 and may usefully position the carriage relative to the surface layer 38. In addition to frame 94, carriage 40 may include chamber 98 for receiving air generated by blower 102 and for passing same over heating elements 100 prior to being directed against a dispensed liquid photocurable composition on surface layer 38 as will be described hereinafter for limiting formation of voids caused by entrapped air or gas bubbles. Desirably included in association with carriage 40 is shield 111 which may be counterweight operated by line 113. Shield 111 may be thus removed from interfering with the movement of elements in the raised position and yet provides a shield to restrict photocuring of any excess of liquid composition which may be removed from the surface layer during the leveling sequence.

FIG. 6 illustrates as a perspective view the dispensing element. The dispensing element may include air cylinder 42 receiving air through manifold tubing system 104 which may also serve to provide either air or vacuum for additional elements associated with the apparatus of the present invention. Cylinder 42 which may be supported by the apparatus is used to rotate tubing 44 relative to the tubing 48 for dispensing liquid composition when dispensing ports are rotated from closed position within housing 49. Rotation of tubing 44 relative to tubing 48 may be effected through a joining bar 106 such as is illustrated.

Liquid composition may be received in line 88 to housing 105 for passage to line 48 for dispensing or for recirculation through line 46. If desired, heating element 107 may be includes to maintain the fluidity of the liquid composition within housing 105 and prevent congealing thereof on doctor blade 117.

FIG. 7 further illustrates a means by which dispensing may be accomplished. Tubing 48 having a multiple number of dispensing slots or ports 91 positioned there along may be in closed position as illustrated within dispenser housing 49. Dispensing housing may be formed of any material which will prevent leakage but preferably is formed of a long wearing material such as nylon, Teflon or the like. Dispensing may be accomplished upon rotation as indicated by the direction arrow to dispensing position of the substantially vertical position over the support surface. Other means for dispensing may also be devised if desired. The dispenser housing 49 may be maintained relative to dispenser tubing 48 by support elements 103 which may provide any degree of pressure to housing 49 and to tubing 48.

FIG. 8 further illustrates the end section of the dispensing element and and includes dispensing housing 49 with dispenser tubing mounted therein and for rotation, there is included bracket 106. Housing 49 may be clamped against tubing 48 by elements 103 as previously indicated.

FIG. 9 illustrates as a front elevational view, the various elements of the apparatus of the present invention when in normal position. The apparatus may include bar 18 for generating ions to eliminate any static electricity that may accumulate within the compartment, on the transparency film, or the like. A static electricity eliminator usefully employed is one of the types which generates ions flowing on a stream of air. Examples of useful ion generators include static electricity eliminators generally referred to as aerostat units such as those manufactured by Testane Electronics of Flourtown, Pennsylvania.

Disposed on framing elements 29 may appear switch 58 either for starting or stopping dispensing of the liquid photocurable composition or for starting or stopping generation of a heated stream of air projected against the dispensed liquid composition on the surface layer of platen 110.

Desirably, a vacuum transport 112 is included to retain a thin support film against a platen such as vacuum table 110 over which the dispensed liquid photocurable composition may be received from dispenser tubing 48.

Vacuum table 110 with a vacuum source to pull a vacuum through a hollowed out portion of the table or through small orifices on the upper side of the table is included to secure a support layer or mold thereto. The same channeling through the vacuum table by which a vacuum is applied may be also intermittently used to apply air or other gaseous pressure to the support layer or mold to facilitate removal thereof from the table.

In the liquid composition dispensing system, tubing 44 may be pivoted about dispensing tubing 48 by piston 42 attached to the upper section of carriage 40 as illustrated. In the nondispensing position, liquid composition may be recycled through line 44 and returned to the supply as previously indicated.

FIG. 9 further includes frame 94 supporting transparent mounting plate 108 to which may be adhered by any suitable means an image bearing transparency.

Vacuum table 110 may be heated by heating elements 114 illustrated as infrared heating lamps for maintaining a desired temperature on the surface layer thereof and to prevent congealing of the liguid composition thereon. The heating elements may be regulated such to provide a substantially constant temperature on the surface layer or vacuum table 110.

Sprocket chain 32 may be included for positioning rail mount 34 for movement of the carriage as will be more clearly apparent hereafter.

The sequence of operation of the present invention is more fully illustrated in FIGS. 10—13. In FIG. 10 there is illustrated a first position of the operating sequence with frame 94 appearing substantially vertically disposed and supported in such position by clamp 112 braced by a spring for pivotal movement in a horizontal plane. Air chamber 98 and air blower 102 further provide elements for carriage 40.

The liquid composition dispensing system includes liquid dispenser 48 in nondispensing position in mounting 103 relative to recycle tubing 44 which may be pivotally moved about dispenser tubing 48 by piston 42 activates by air received through tubing manifold 104. Doctor blade 117 is included adjacent the liquid dispensing system for leveling dispensed composition as will be indicated subsequently.

Spring 109 may be included for retaining frame 95 in a level position during the exposure step and for removing the bracket arms from interfering position in the nonoperating position when frame 94 is disposed substantially vertically.

In association with surface layer or vacuum table 110 having vacuum line 112 therewith, is guide 116 to trough 118 for receiving excess composition removed after application by doctor blade 117. The doctor blade traverses the dispensed liquid composition and removes overflow excess composition to the trough 118. In order to prevent exposure of liquid composition adhered to doctor blade 117, shield 111 is provided an may be lowered to prevent exposure thereof during exposure of the dispensed and leveled liquid composition on vacuum table 110. The shield may be weight operated such that in the exposure position, the shield is sequentially lowered while in the nonexposure position, the shield is sequentially raised from interfering position. Any means may be employed in preventing premature exposure of the liquid composition. Heating lamps 114 may be desirably included for maintaining a surface temperature to vacuum table 110 for optimum spreading and leveling of the liquid composition and for preventing congealing of the composition thereon.

Sprocket chain 32 is illustrated attached to rail block 34 for positioning along rail 36 relative to table 110. Further illustrated in FIG. 10 along frame network 29 is switch 56 and switch 58 for starting and stopping the operation of the liquid dispensing system as well as for starting and stopping the air blowing system.

From the normal starting position of FIG. 10, the carriage may be moved to the right as indicated in FIG. 11 with movement being effected by a variable speed motor connected in operating relationship with sprocket chain 32 for moving rail block 34 along rail 36. As an element of carriage 40 contacts switch 56, piston 42 is actuated and tubing 44 is pivoted about dispensing tubing 48 thus opening the slots or dispensing nozzles for dispensing liquid composition onto surface layer 110. As the carriage continues movement to the right to the phantom position illustrated, dispensing is continues along the surface layer in a substantially constant fashion.

After the carriage has moved to switch 58, it occupies a general position illustrated in FIG. 12 and at which point dispensing is terminated by piston 42 which returns by pivotal movement tubing 44 about tubing 48 within clamp 103. At this point, the movement of rail block 34 along rail 36 is also terminated.

After the liquid dispensing has terminated, the motor driven sprocket chain 32 is reversed for movement of the carriage 40 back to normal position. Upon the return movement, switch 58 actuates air blower 102 which directs a stream of air into housing 98 wherein it is heated and directed over the dispensed liquid composition on the surface layer. As the carriage is returned to normal position, the doctor blade 117, preceding the air unit, levels the applied liquid composition to a substantially uniform layer over a support sheet positioned on the vacuum table 110. Following the leveling as carriage 40 moves to the left as illustrated to phantom position of FIG. 12, heated air is directed against the leveled composition to remove surface bubbles which may appear therein and thus provides a substantially level and consistent layer of liquid composition having substantially unblemished surface characteristics.

As the carriage moves past switch 56, the generation of air by blower 102 is terminated electrically and the carriage proceeds to normal position indicated in FIG. 10.

After the carriage has been returned to the normal position indicated in FIG. 10, the system is now ready for the exposure step and as illustrated in FIG. 13, frame 94 holding a mounted transparent film thereon may be pivoted to the exposing position over table 110 for exposure of the leveled liquid composition. Although it appears in the general view of FIG. 13 that frame 94 contacts table 110, it is possible to provide an intermediate air space thus avoiding contact of the transparency mounted to the bottom surface of the mounting plate within frame 94 with the liquid composition on table 110. The air space may be maintained by a spacer, if desired, as will be described hereinafter. Other means may be devised for maintaining an air space intermediate the mounted transparency and the liquid composition as may be necessary or desired. Alternatively, the spacers may be omitted and the image bearing transparency may be placed in contact with and in substantially parallel relationship to the surface of the liquid composition.

The liquid composition received from dispenser tubing 48 may be supplied in a metered quantity by means of a variable volumetric flowmeter or may be regulated by a flow rate dispensing over a prescribed period of time all regulated electronically.

Thus, to operate the apparatus, a support layer may be placed on the vacuum table and thereon may be place a framing wall mold. A vacuum is applied to the vacuum table through the orifices to maintain the support layer in a secured position. Next, the carriage is activated by a manipulating switch to a position, to transfer the flow of the liquid composition from the recycle line to the feed outlet in order to supply the frame with sufficient liquid composition in a predetermined metered amount dependent upon the volume of the frame or the amount dispensed therein. The doctor blade is moved in parallel by a sprocket chain and heated air is activated by a programmable switch upon movement of the carriage traverse the frame thereby spreading the liquid composition evenly therein while scraping off the overflow liquid composition into the drain. The leveled composition is heated by warm air blown thereagainst. If desired, a spacer is positioned onto the filled mold containing the liquid composition and an image bearing transparency, preferably adhering to a photographic glass plate is positioned with the transparency down in substantially spaced parallel relationship to the surface of the liquid composition. If the spacer is omitted the image bearing transparency may be placed in direct contact with the surface of the liquid composition or to facilitate removal therefrom a thin layer of a protective film of silicone or other well known release agent may be applied to the transparency prior to contact with the liquid photosensitive composition.

After the transparency is in position, the actinic light is turned on for a period of time to selectively photocure the liquid composition layer.

After the required exposure to actinic light is obtained, the light source is turned off. The vacuum to vacuum table may be shut off and the support with the photocured composition is removed from the apparatus. The photocured composition and its support are then washed and/or blotted with a porous absorbent material to remove the unexposed liquid composition.

A convenient method of carrying out this invention is to place an image-bearing, line or halftone stencil or positive or negative transparency parallel to the surface of a layer of a photocurable or photopolymerizable composition which has been cast directly on a support. The image-bearing transparency and the surface of the composition may be in contact or have an air gap therebetween, as desired. The photocurable or photopolymerizable layer is exposed through the transparency to a source of actinic light, preferably a point or collimated light source when a liquid photocurable composition is used, until the layer is cured or polymerized to an insoluble stage in the exposed areas. The thickness of the ultimate relief in such a method may be controlled by varying the thickness of the layer of the composition. The thus cured plate is then immersed in an aqueous solution of a detergent in a bath and the bath may be ultrasonically activated to the degree necessary to cause cavitation in the bath. Thereafter, the photocured printing plate is washed in a spray of water and dried in an air dryer.

The image-bearing transparency may be secured to a transparent plate 121 as illustrated in the exposing position of FIG. 14 and may be held to a flat surface thereof by vacuum lines 123 to a vacuum source via line 125.

One photocurable system which is suitable for use herein is formed from a layer of a photocurable polymeric composition consisting of a polyene containing at least two unsaturated carbon to carbon bonds per molecule, a polythiol containing two or more thiol groups per molecule and a photosensitizer. The layer of photocurable polymeric composition may be adhered to a support such as one formed of rubber, plastic, paper, glass, metal and the like.

As used herein polyenes and polyynes refer to simple or complex species of alkenes or alkynes having a multiplicity, i.e., at least 2, "reactive" carbon o carbon unsaturated functional groups per average molecule. For example, a diene is a polyene that has two "reactive" carbon to carbon double bonds per average molecule, while a diyne is a polyyne that contains in its structure two "reactive" carbon to carbon triple bonds per average molecule. Combinations of "reactive" double bonds and "reactive" triple bonds within the same molecule are also operable. An example of this is monovinylacetylene, which is a polyeneyne. For purposes of brevity all these classes of compounds will be referred to herein as polyenes.

As used herein the term "reactive" unsaturated carbon to carbon groups means groups which will react under proper conditions as set forth herein with thiol groups to yield the thioether linkage $$\left(-\overset{|}{\underset{|}{C}}-S-\overset{|}{\underset{|}{C}}-\right)$$

as contrasted to the term "unreactive" carbon to carbon unsaturation which means $$-\overset{|}{C}=\overset{|}{C}-$$

groups when found in aromatic nuclei (cyclic structures exemplified by benzene, pyridine, anthracene, tropolone and the like) which do not under the same conditions react with thiols to give thioether linkages. Products from the reaction of polyenes with polythiols which contain 2 or more thiol groups per average molecule are called polythioether polymers or polythioethers.

One group of operable polyenes to react with polythiols to form printing plates includes those materials having a molecular weight in the range 300 to 20,000, a viscosity ranging from 0 to 20 million centipoises at 70° C. of the general formula: $[A]-(X)_m$ wherein X is a member of the group consisting of $$R-\overset{R}{\overset{|}{C}}=\overset{R}{\overset{|}{C}}-$$

and R—C≡C—; m is at least 2; R is independently selected from the group consisting of hydrogen, halogen, aryl, substituted aryl, cycloalkyl, substituted cycloalkyl, aralkyl, substituted aralkyl and alkyl and substituted alkyl groups containing 1 to 16 carbon atoms and A is a polyvalent organic moiety free of (1) reactive carbon to carbon unsaturation and (2) unsaturated groups in conjugation with the reactive ene or yne groups in X. Thus A may contain cyclic groupings and minor amounts of hetero atoms such as N, S, P or O but contains primarily carbon-carbon, carbon-oxygen or silicon-oxygen containing chain linkages without any reactive carbon to carbon unsaturation.

Examples of operable polyenes from this group include, but are not limited to (1) crotyl-terminated polyurethanes which contain two "reactive" double bonds per average molecule in a near terminal position of the average general formula:

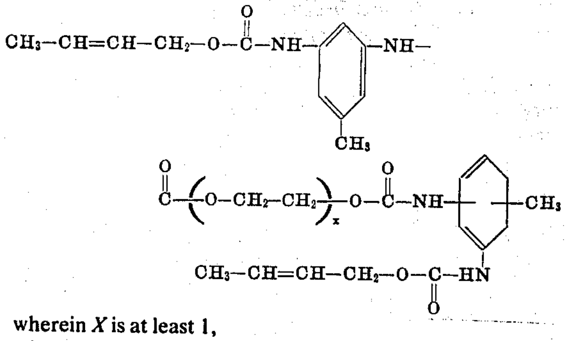

wherein $X$ is at least 1, (2) ethylene propylene nonconjugated diene terpolymers, such as "Nordel 1040" manufactured by duPont which contains pendant "reactive" double bonds of the formula:

$$-CH_2-CH=CH-CH_3$$

(3) the following structure which contains terminal "reactive" double bonds:

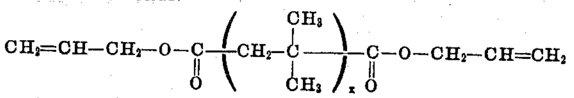

where $x$ is at least 1. (4) the following structure which contains near terminal "reactive" double bonds:

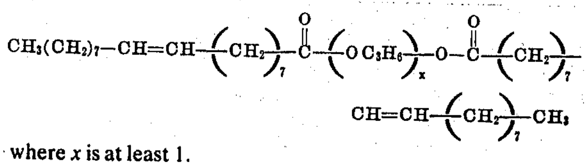

where $x$ is at least 1.

Another group of operable polyenes includes unsaturated polymers in which the double or triple bonds occur also within the main chain of the molecules. Examples include conventional elastomers (derived primarily from standard diene monomers) such as polyisoprene, polybutadiene, styrene-butadiene rubber, isobutylene-isoprene rubber, polychloroprene, styrene-butadiene-acrylonitrile rubber and the like; unsaturated polyesters, polyamides, and polyurethanes derived from monomers containing "reactive" unsaturation, e.g., adipic acid-butenediol, 1,6-hexahediamine-fumeric acid and 2,4-tolylene diisoyanate-butendiol -condensation polymers and the like. Included in the term "polyenes" as used herein are those materials which in the presence of an inert solvent, aqueous dispersion or plasticizer fall within the viscosity range set out above at 70° C.

A third group of operable polyenes includes those polyenes in which the reactive unsaturated carbon to carbon bonds are conjugated with adjacent unsaturated groupings. Examples of operable reactive conjugated ene systems include but are not limited to the following:

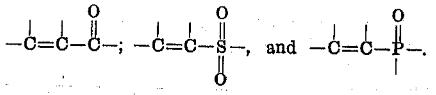

A few typical examples of polymeric polyenes which contain conjugated reactive double bond groupings such as those described above are polyethylenether glycol (600 M.W.) diacrylate; polytetramethylenether glycol (100 M.W.) dimethacrylate; the triacrylate of the reaction product of trimethylol propane with 20 moles of ethylene oxide; and the like.

As used herein, the term polythiols refers to simple or complex organic compounds having a multiplicity, i.e. at least two, of pendant or terminally positioned—SH functional groups per average molecule.

On the average the polythiols must contain two or more—

SH groups/molecule. They usually have a viscosity range of 0 to 20 million centipoises (cps.) at 70° C. as measured by a Brookfield Viscometer. Included in the term "polythiols " as used herein are those materials which in the presence of an inert solvent, aqueous dispersion or plasticizer fall within the viscosity range set out above at 70° C. Operable polythiols in the instant invention usually have molecular weights in the range 50—20,000, preferably 100—10,000.

The operable polythiols may be exemplified by the general formula: $R_8-(SH)_n$ where *n* is at least 2 and $R_8$ is a polyvalent organic moiety free from "reactive" carbon to carbon unsaturation. Thus $R_8$ may contain cyclic groupings and minor amounts of hetero atoms such as N, S, P or O but primarily contains carbon-hydrogen, carbon-oxygen, or silicon-oxygen containing chain linkages free of any "reactive" carbon to carbon unsaturation.

One class of operable polythiols with polyenes to obtain essentially odorless cured polythioether printing plates are esters of thiol-containing acids of the general formula: $HS-R_9-COOH$ where $R_9$ is an organic moiety containing no "reactive" carbon to carbon unsaturation with polyhydroxy compounds of the general structure: $R_{10}-(OH)_n$ where $R_{10}$ is an organic moiety containing no "reactive" carbon to carbon unsaturation and *n* is 2 or greater. These components will react under suitable conditions to give a polythiol having the general structure:

$$R_{10}-\left(O\overset{\overset{O}{\|}}{C}-R_9-SH\right)_n$$

where $R_9$ and $R_{10}$ are organic moieties containing no "reactive" carbon to carbon unsaturation and *n* is 2 or greater.

Certain polythiols such as the aliphatic monomeric polythiols (ethane dithiol, hexamethylene dithiol, decamethylene dithiol, tolylene-2, 4-dithiol, etc.) and some polymeric polythiols such as a thiol-terminated ethycyclohexyl dimercaptan polymer, etc. and similar polythiols which are conveniently and ordinarily synthesized on a commercial basis although having obnoxious odors, are operable in this invention. Examples of the polythiol compounds preferred because of their relatively low odor level and fast curing rate including but are not limited to esters of thioglycolic acid ($HS-CH_2COOH$), α-mercaptopropionic acid ($HS-CH(CH_3)-COOH$ and glycolic acid ($HS-CH_2CH_2COOH$) with polyhydroxy compounds such as glycols, triols, tetraols, pentaols, hexaols, etc. Specific examples of the preferred polythiols include but are not limited to ethylene glycol bis (thioglycolate), ethylene glycol bis (β-mercaptopropionate), trimethylolpropane tris (thioglycolate), trimethylolpropane tris (β-mercaptopropionate), pentaerythritol tetrakis (thioglycolate) and pentaerythritol tetrakis (β-mercaptopropionate), all of which are commercially available. A specific sample of preferred polymeric polythiol is polypropylene ether glycol bis (β-mercaptopropionate) which is prepared from polypropylene-ether glycol (e.g. Pluracol P2010, Wyandotte Chemical Corp. and β acid by esterification.

The preferred polythiol compounds characterized by a low level of mercaptanlike odor initially, and after reaction, give essentially odorless cured polythioether end products which are commercially useful resins or elastomers for printing plates.

As used herein the term "odorless" means the substantial absence of the well-known offensive an sometimes obnoxious odors that are characteristic of hydrogen sulfide and the derivative family of compounds known as mercaptans.

The term "functionality" as used herein refers to the average number of ene or thiol groups per molecule in the polyene or polythiol, respectively. For example, a triene is a polyene with an average of three "reactive" carbon to carbon unsaturated groups per molecule and thus has a functionality (*f*) of three. A diothiol is a polythiol with an average of two thiol groups per molecule and thus has a functionality (*f*) of two.

It is further understood and implied in the above definitions that in these systems, the functionality of the polyene and the polythiol component is commonly expressed in whole numbers although in practice the actual functionality may be fractional. For example, a polyene component having a nominal functionality of 2 (from theoretical considerations alone) may in fact have an effective functionality of somewhat less than 2. In an attempted synthesis of a diene from a glycol in which the reaction proceeds to 100 percent of the theoretical value for complete reaction, the functionality (assuming 100 percent pure starting materials) would be 2.0. If, however, the reaction were carried to only 95 percent of theory for complete reaction, about 10 percent of the molecules present would have only one ene functional group, and there may be a trace of material that would have no ene functional groups at all. Approximately 90 percent of the molecules, however, would have the desired diene structure and the product as a whole then would have an actual functionality of 1.9. Such a product is useful in the instant invention and is referred to herein as having a functionality of 2.

The aforesaid polyenes and polythiols may, if desired, be formed or generated in situ and still fall within the scope of the instant invention.

To obtain the maximum strength, solvent resistance, creep resistance, heat resistance and freedom from tackiness, the reaction components consisting of the polyenes and polythiols are formulated in such a manner as to give solid, cross-linked three dimensional network polythioether polymer systems on curing. In order to achieve such infinite network formation, the individual polyenes and polythiols must each have a functionality of at least 2 and the sum of the functionalities of the polyene and polythiol components must always be greater than 4. Blends and mixtures of the polyenes and the polythiols containing said functionality are also operable herein.

In general, it is preferred, especially at or near the operable lower limits of functionality in the polyene and polythiol, to use the polythiol and the polyene compounds in such amounts that there is one thiol group present for each ene group, it being understood that the total functionality of the system must be greater than 4, and the functionality of the thiol and the diene must each be at least 2. For example, if two moles of a triene are used, and a dithiol is used as the curing agent, making the total functionality have a value of 5, it is preferable to use three moles of the dithiol. If much less than this amount of the thiol is used, the curing rate will be lower and the product will be weaker in some respects because of the reduced cross-link density. If much more than the stoichiometric amount of the thiol is used, the rate of cure may be higher, if that is desirable, although excessive amounts may lead to a plasticized cross-linked product which may not have the desired properties. However, the relative amounts of polyenes and polythiols may be adjusted to any values above the minimum scope disclosed herein which give desirable properties to the cross-linked polythioether. It must be emphasized that regardless of the ratio of polythiol to polyene, the total functionality of the system must be greater than four, or a cross-linked network will not result, and the product will be a swellable, chain-extended composition which is unsuitable. Thus, to obtain a solid cross-linked printing plate it is necessary to use a polyene containing at least 2 reactive unsaturated carbon to carbon bonds per molecule in an amount that the combined functionality of the reactive unsaturated carbon to carbon bonds per molecule and the thiol groups per molecule is greater than 4.

Another composition operable to form a relief printing plate by the process of the instant invention is that set out in Bristish Pat. Nos. 1,102,910 and 1,007,345. Therein the liquid composition consisting of: (A) 0.001 to 5 percent by weight of a polyboron acid salt of the formula $M'_2(B_nH_{n-p-q}X_pY_q)_{m'}$ (I) wherein *M'* is a silver (I) or cerium (III) cation, X is halogen; Y is a hydroxyl group, or a hydrocarbyloxyalkoxy or hydrocarbylcarbonyl group free of aliphatic unsaturation and containing at most 12 carbon atoms; *n* is 10 or 12; *p* is 1 to 12 and is equal to *n*minus *q* when *q* greater than zero; *q* is 0 to 2, *p* +*q* being at most equal to *n*; and *m'* is the valence of *M'*; (when *p* is greater than 1, the halogens represented by X may be the same or chlorine, bromine or iodine and which is dissociable by actinic light of wavelength between 2500 A; and 7000 A; and (C) at least one substance capable of undergoing cationic polymerization on exposure to actinic light having a wavelength in the range 2500 to 7000 A. Thus, in carrying out the process in the instant invention any liquid photosensitive composition capable of being photopolymerized or photocured or both upon exposure to actinic radiation to a solid polymer is operable to form a relief printing plate.

Another liquid photocurable composition useful to form printing plates is that set out in French Pat. No. 1,471,432. Generally, liquid photosensitive compositions disclosed in this patent comprise as essential constituents, an unsaturated polyester, an ethylenically unsaturated monomer leading itself to a reaction of addition polymerization, and a photosensitizer. The unsaturated polyester may be produced from an alcohol monomer containing at least a polyol comprising at least 5 ether-oxygen radicals linked to carbon atoms in its main chain and not having more than 3 carbon atoms between the ether-oxygen radicals, and a monomer of acidic character containing at least an unsaturated dicarboxylic acid and/or one of its derivatives.

The liquid photocurable compositions to be converted to printing plates may, if desired, include such additives as antioxidants, accelerators, dyes, inhibitors, activators, fillers, pigments, antistatic agents, flame-retardant agents, thickeners, thixotropic agents, surface active agents, light scattering agents, viscosity modifiers, extending oils, plasticizers, detackifiers and the like. Such additives are usually preblended with the monomer or compound to be photopolymerized or with the polyene or polythiol prior to or during the compounding step. Operable fillers include natural and synthetic resins, carbon black, glass fibers, wood flour, clay, silica, alumina, carbonates, oxides, hydroxides, silicates, glass flakes, glass beads, borates, phosphates, diatomaceous earth, talc, kaolin, barium sulfate, calcium sulfate, calcium carbonate, antimony oxide and the like. The aforesaid additives may be present in quantities up to 500 parts or more per 100 parts polymer by weight an preferably about 0.005 to about 300 parts on the same basis. Each additive must be present in an amount which will not interfere with or inhibit the necessary photocuring or photopolymerization image producing reaction or other required steps in the plate making process.

Additionally, in liquid photosensitive compositions which are photocured, chemical photoinitiators or sensitizers such as benzophenone, acetophenone, acenapthene-quionone, methyl ethyl ketone, thioxanthen-9-one, xanthen-9-one, 7-H-Benz [de] anthracen-7-one, dibenzosuberone, 1-naphthaldehyde, 4, 4'-bis (dimethylamino) benzophenone, fluorene-9-one, 1'-acetonaphthone, 2'-acetonaphthone, 2,3-butanedione, anthraquinone, *l*-indanone, 2-tert.-butyl anthraquinone, valerophenone, hexanophenone, 8-phenylbutyrophenone, p-mor pholinopropiophenone, 4-morpholinobenzophenone, 4'-morpholinodeoxybenzoin, p-diacetylbenzene, 4-aminobenzophenone, 4'-methoxyacetophenone, benzaldehyde$\beta$-tetralone, 9-acetylphenanthrene, 2-acetylphenanthrene, 10-thioxanthenone, 3-acetylphenanthrene, 3-acetylinodole 1,3,5-triacetylbenzene, etc. and blends thereof, to greatly reduce the exposure times and thereby when used in conjunction with various forms of energetic radiation yield very rapid, commercially practical cures. The curing rate accelerators are usually added in an amount ranging from about 0.0005 to about 10 percent by weight of the photocurable composition.

Curing inhibitors or retarders operable include but are not limited to hydroquinine, P-tert-butyl catechol; 2,6-ditert-butyl-p-methylphenol; phenothiazine and N-phenyl-2-napthylamine.

The thickness of the layer of the liquid photocurable composition employed depends on the thickness desired in the relief image and on the alignment between the relief figures. That is, if the printing areas are closely aligned less relief is necessary than if the printing areas are further apart. This is to assure that the nonprinting areas are not contacted with the surface of the material on which the printing is to occur. In the case of photosensitized half-tones, the screening used must be taken into consideration when selecting the proper thickness. In general, the thickness of the layer to be solidified and employed as a printing plate may vary from 3 to 250 mils or more. For letterset (dry offset) plates, the thickness may be customarily in the 3 to 25 mil range; for letterpress printing, thicknesses of 10 to 500 mils are common. For letterpress newspaper or magazine printing plates, the thickness of the photosensitive layer will be abut 10 to about 50 mils. Thicker layers are sometimes employed for the flexographic printing of designs and relatively large areas with letterpress printing plates. Thus, in general, the thickness of the liquid photosensitive composition employed as a printing plate can vary from 0.1 to 500 mils or more.

The support to which the photosensitive composition is adhered may be formed from various materials such as rubber, plastic, paper, glass, metal and the like. The support is preferably a plastic having the characteristics of being flexible, adherable to the photosensitive composition on exposure to actinic radiation or by other means and capable of transmitting a substantial amount of the radiation therethrough. The thickness of the support is dependent on its relative strength and dimensional stability to hold a specified thickness of the photosensitive composition and may be empirically determined by one skilled in the art. For example when an oriented polyethylene terephthalate in film form sold under the trade name "Mylar" is employed as the support and a 20 mil relief is desired, the "Mylar" film will have a thickness of about 1 to 10 mils. Nonactinic radiation transmitting metal plates such as aluminum for the same thickness of photocurable composition usually have a thickness of about 1 to 8 mils.

The photocurable reaction may be initiated by actinic radiation from sunlight or from special light sources which emit significant amounts of actinic light suitably in the wavelength range of 2500—7000 A. For liquid photocurable compositions it is preferred that the light emanate from a point source or in the form of parallel rays. However, divergent beams are also operable under certain circumstances as a source of actinic light. Thus it is possible merely to expose the liquid photocurable composition to actinic radiation, preferably in the range 3000—4000 A, under ambient conditions or otherwise and obtain a solid elastomeric or resinous product useful as a printing plate material after development.

The actinic light source is activated so as to radiate actinic light through the image bearing transparency onto the exposed portion of the liquid photocurable composition thereby solidifying the exposed portion. The UV wavelength operable to produce printing plates in the apparatus of the invention is in the range 2500—4000 angstroms. Various light sources may be used to obtain sufficient UV light to operate the instant apparatus as desired. Such sources include but are not limited to, carbon arcs, mercury arcs, fluorescent lamps with special ultraviolet light emitting phosphors, xenon arcs, argon glow lamps and photographic flood lamps. Of these, the mercury vapor arcs, particularly the sun lamp type and the xenon arcs are very useful. The sun lamp mercury vapor arcs are customarily used at a distance of 7 to 10 inches from the liquid composition, whereas the xenon arc is placed at a distance of 24 to 40 inches from the liquid layer. With a more uniform extended source of low intrinsic brilliance, such as a group of contiguous fluorescent lamps with special phosphors, the liquid photocurable composition may be exposed within an inch of the lamp. The lamp to plate distance is found to depend upon several variable including light intensity, collimation of rays and the like.

It is important to select the correct exposure time in employing the apparatus of the instant invention. That is, in making printing plates, it is essential that the exposure be sufficient to harden the photocurable composition in the exposed image areas without causing hardening in the nonimage areas. Aside from the exposure time and light intensity, the extent of the exposure is dependent on the the thickness of the liquid layer, the temperature, the presence of light absorbing pigments or dyes in the liquid composition and the character of the image to be reproduced. In general, the thicker the layer of the liquid composition the longer the exposure time. It has been observed that hardening starts at the surface of the liquid layer closest to the light source and proceeds downward to the support. With insufficient exposure, the layer may have a hard surface but, through lack of a clear through hardening the relief will be removed when the unexposed area is removed in development i.e. washing. When the the hardening rate increases at higher temperatures, less exposure may be required thereat than at room temperature. However care must be exercised that too high a temperature is not obtained during exposure to an actinic light, as this leads to, in some cases, thermal expansion of the liquid composition which results in image distortion. It is preferred that the actinic light radiation be carried out at a temperature in the range of 20—70° C. Due to the number of variables which affect exposure time, optimum results are best obtained by trial and error with characterization after each exposure. The actinic light may be applied to the liquid composition for periods ranging from 1 second to 20 minutes. Printing plates from liquid compositions may also be prepared by the instant apparatus by projecting the actinic light through a suitable lens systems. The employment of a spacer between the liquid composition layer and the image bearing transparency facilitates removal of the hardened photocured composition from the image bearing transparency after it has been exposed to actinic light. The spacers are merely employed to maintain an air gap between the liquid photosensitive composition and the image bearing transparency and said air gap can range from 0.1 to 250 mils or more.

The solvent employed for washing (i.e. developing the relief image) of the printing plate made from the liquid composition is primarily a diluent which reduces the viscosity of the unexposed liquid composition so that it is easily removed. Removal may be speeded up by blotting the unexposed area with a sponge and the like. The washing liquid is selected so that it is readily miscible with or emulsified with the unexposed liquid composition yet has little action on the exposed hardened image or the support layer. The solvent employed for washing will depend on the liquid composition and includes, but is not limited to water, water and a detergent and/or soap, mixtures of alcohols e.g. methanol and/or ethanol with or without ethyl, methyl, or propyl acetate. Other solvents with high evaporation rates are well known to those skilled in the art. It should be noted that the term "solvent" includes not only organic solvents but also water and other aqueous systems wherein the unexposed liquid composition is soluble (including dispersible) in said systems and the exposed liquid portion is not so affected. In those instances where the liquid composition is acidic or basic, the printing relief may be developed by dissolving or dispersing the unexposed areas in an aqueous system of the opposite polarity i.e. to use an aqueous acidic solvent system with a basic liquid composition and vice versa. The solvent can be applied by a sponge, brush, blotter or by means of jets or sprays. If desired, a porous, absorbent material may be used without a solvent in which case the unreacted liquid is removed mechanically.

The following examples will aid in explaining, but should not be deemed as limiting, the instant invention. In all cases unless otherwise noted, all parts and percentages are by weight.

EXAMPLE 1

To a liter flask equipped with stirrer, thermometer and gas inlet and outlet was charged 450 g. (0.45 moles) of polytetramethylene ether glycol, having a hydroxyl number of 112 and a molecular weight of 1,000, along with 900 g. (0.45 moles) of polytetramethylene ether glycol having a hydroxyl number of 56 and a molecular weight of 2,000, both commercially available from Quaker Oats Co. The flask was heated to 110° C. under vacuum and nitrogen and maintained thereat for 1 hour. The flask was then cooled to approximately 70° C. whereat 0.1 g. of dibutyl tin dilaurate was added to the flask. A mixture of 78 g. (0.45 moles) of tolylene diisocyanate and 78 g. (0.92 moles) of allyl isocyanate was thereafter added to the flask dropwise with continuous stirring. The reaction was maintained at 70° C. for 1 hour after addition of all the reactants. The thus formed allyl terminated polymer will hereinafter be referred to as Polymer A.

EXAMPLE 2

A liquid photocurable composition was prepared by mixing 102.3 g. of Polymer A from Example 1 herein, 7.7 g. of pentaerythritol tetrakis (β-mercaptopropionate), 1.5 g. benzophenone and 0.1 g. of 2,6-ditertiary-butyl-methyl phenol. The mixture was heated to 80° C. to dissolve the benzophene and produce a clear homogeneous mixture. A suitable mold for making a printing plate was prepared using a 4 mil thick "Mylar" film as a support edged on two sides with a 20 mil thick rubber electric tape thereby forming a frame or mold to partially contain the liquid curable polymer. The mold was leveled on an adjustable flat table and the liquid photocurable composition at a temperature of 80° C. was poured into the mold along an edge of the frame and distributed evenly throughout the mold by means of a doctor blade to form a printing plate of 20 mil thickness on top of the 4 mil Mylar support. Shims were placed at the top of the edge of the mold and a test negative of a combination of an 85 line halftone, standard type and reverse type, 65 line gray-scale and a solid area under a glass plate was placed on top of the shims leaving an air gap of 7—12 mils between the surface of the liquid curable composition and the test negative. The photocurable composition was exposed through the negative to light from a 4000 watt Ascorlux pulsed xenon arc printing lamp commercially available from American Speed Light Co. placed 26 inches above the plate. The exposure was for about 2 minutes during which time the liquid photocurable composition gelled in the image areas. The nonimage areas remained a liquid essentially of the same viscosity as prior to exposure.

The photocured printing plate was transferred to an aqueous bath at 180° F. containing 10 percent of a detergent commercially available under the trade name "Liqui-Nox" from Alconox Inc., New York, New York. The bath was ultrasonically activated to produce cavitation in the bath by means of three transducers (each 1 kilowatt) on the bottom of the bath connected to separate generators, each energized at about 20 k.c/sec. After 6 one-fourth minutes in the bath, the printing plate was removed therefrom. The resultant etched plate was completely clear of uncured liquid polymer and had a solid relief image of 20 mils in depth in the exposed photocured areas of the plate. The relief was sharp with complete recesses in the bowls of letters such as *o*, *p*, etc. and the image areas had smooth surfaces and shoulders. The glossy plate was inked and employed in letterpress printing on a Davidson Press Model 816 manufactured by Davidson Corp., Chicago, Ill. The lines were distinct and separate and the dots in the halftone area had excellent definition.

A control run using the reactants and procedure set out herein as in Example 2 except that the bath was not ultrasonically activated resulted in substantially no etching or removal of uncured polymer after 30 minutes immersion in the bath.

EXAMPLE 3

Example 2 was repeated except that the detergent added to the bath consisted of 3 percent ethylene glycol and 5 percent by weight of a commercially available detergent sold under the trade name "Liqui-Nox" commercially available from Alconox Inc., New York, New York and the bath was maintained at 170° F. The resultant etched plate was completely free of uncured liquid polymer and had a solid relief image of 20 mils in depth in the exposed photocured areas of the plate within 6 minutes. The plate was inked and printing resulted in distinct and separate lines and excellent definition of the dots in the halftone area.

EXAMPLE 4

Example 2 was repeated except that the detergent in the bath consisted of 1 percent "LiquiNox" commercially available from Alconox Inc., New York, New York and 1 percent "D-Lite" commercially available from DuBois Chemicals, Cincinnati, Ohio. The bath was maintained at 170° F. After 7 minutes the plate was completely etched, free of uncured polymer and had a solid relief image, 20 mils in depth in the exposed photocured areas. The relief was well defined with complete recesses in the letters. The plate was inked and printed. A clear image of distinct and clear liens and excellent definition of the dots was transferred to the paper.

EXAMPLE 5

Example 2 was repeated except that the detergent consisted of 5.6 percent by weight of "New Score" commercially available from Economics Laboratory, Inc., New York, New York and 5 percent "LiquiNox". The bath was maintained at 180° F. After 5 minutes the resultant etched plate was completely free of uncured polymer and had a solid relief image of 20 mils in depth in the exposed photocured areas of the plate. The plate gave excellent copies when used on the Davidson Press Model 816.

EXAMPLE 6

Example 2 was repeated except that the detergent in the bath was 2.5 percent by weight of a commercially available detergent sold under the trade name "D-Lite" commercially available from DuBois Chemicals, Cincinnati, Ohio. The bath was maintained at 170° F. After 1 minute and 35 seconds, the etched plate was substantially completely free of uncured polymer and had a solid relief image with the main bodies of the letters penetrating to the support. The plate gave excellent copies when used on the printing press.

EXAMPLE 7

Example 2 was repeated except that the detergent in the bath was 0.5 percent by weight of a detergent formed of 59 parts by weight of sodium metasilicate pentahydrate, 19 parts by weight of sodium tripolyphosphate, and 9 parts by weight of linear dodecyl benzene sulfonate commercially available under the trademark Santomerse 85–B by Monsanto Chemical Co.) The bath was maintained at about 170° F. After about 1 minute and 15 seconds, the etched plate was substantially completely free of uncured polymer and had a solid relief image with the main bodies of the letters penetrating to the support. The plate gave excellent copies when used on the printing press.

EXAMPLE

A liquid photocurable composition was prepared by mixing 102.3 g. of Polymer A from Example 1 herein, 7.7 g. of pentaerythritol tetrakis (β-mercaptopropionate), 1.5 g. benzophenone and 0.1 g. of 2,6-ditertiary-buty-methyl phenol. The mixture was heated to 70° C. to dissolve the benzophenone and produce clear homogeneous mixture. A sheet of "Mylar" 4 mil thick film was placed on an adjustable flat table and a portion of the photocurable composition at a temperature of 70° C. was poured on the "Mylar" support. The liquid photocurable composition was distributed evenly over the support by means of a doctor blade to a uniform thickness of 20 mils on top of the 4 mil "Mylar" support. Shims were placed around the edge of the support to maintain an air gap of 12 mils between the surface of the liquid curable composition and a test negative of a combination of an 85 line halftone, standard type and reverse type, 65 line gray scale and a solid area. The negative was adhered to a glass plate to maintain it parallel to the surface of the liquid photocurable composition. The photocurable composition was exposed through the glass plate and negative to light from an 8000 watt Ascorlux pulsed xenon arc printing lamp commercially available from American Speed Light Co. placed 54 inches above the plate. The exposure was for about 2 minutes during which time the liquid photocurable composition solidified in the image areas. The nonimage areas remained a liquid essentially of the same viscosity as prior to exposure to actinic light.

The photocured printing plate was back exposed and cured through its "Mylar" support by a 9 lamp bank of GEF 24 T 12 black light high output tubes at a distance of 21 inches therefrom for about 15 seconds to more firmly adhere the photosensitized composition to the support and form a solid 1 mil layer of the photosensitized composition on the support.

The photocured printing plate with a latent image thereon was transferred to an aqueous bath maintained at 170° F. containing 2 percent by weight of a commercially available detergent sold under the trade name "DuBois TK" by DuBois Chemical Co., Cincinnati, Ohio. The bath was ultrasonically activated to produce cavitation in the bath by means of three transducers (each 1 kilowatt) on the bottom of the bath connected to separate generators, each energized at about 21 kc./sec. After 1½minutes in the bath, the printing plate was removed therefrom. The resultant etched plate was completely clear of uncured liquid polymer and had a solid relief image of 20 mils in depth in the exposed photocured line image areas of the plate. The relief was sharp with complete recesses in the bowls of letters such as *o*, *p*, etc. and the image areas had smooth surfaces and shoulders. To further harden the image and prepare it for printing, the plate was post cured for 2 minutes at a distance of 3 inches from a 4000 watt Ascorlux pulsed xenon arc printing lamp commercially available from American Speed Light Co. Thereafter the glossy plate was inked and employed in letterpress printing on a Davidson Press Model 816 manufactured by Davidson Corp., Chicago, Illinois. The lines were distinct and separate and the dots in the halftone area had excellent definition.

The printing plates etched by the instant invention can be employed in various types of printing plates including, but not limited to intaglio printing, lithographic printing, letterpress printing, dry offset printing, flexographic printing and the like.

The various elements of the present apparatus unless otherwise indicated, may be secured to adjoining elements by any suitable means such as bolts, welding, rivets or the like. In addition, auxiliary support or reinforcement members may also be included as part of the apparatus where required.

Although a preferred embodiment of the invention has been illustrated herein, it is to be understood that various changes and modifications may be made in the construction and arrangement of elements without departing from the spirit and scope of the invention as defined.

What we claim is:

1. An apparatus for photocomposing which comprises, a frame network adapted to support at one end thereof an actinic light source and at the other end a platform adapted to receive thereon a photocurable composition, dispensing means for dispensing a liquid photocurable composition to said platform; leveling means for leveling the dispensed liquid composition to a substantially uniform thickness, a transparency film holder having a substantially flat face adjacent to an image bearing transparency supported thereagainst and positionable over said leveled liquid composition, means for supplying actinic radiation through said image bearing transparency to the liquid photocurable composition to selectively insolubilize the exposed portions thereof, and a static electricity eliminator disposed in said frame to eliminate static electricity between the transparency and the surface of the liquid photocurable composition layer.

2. An apparatus for photocomposing which comprises, a frame network adapted to support at one end thereof an actinic light source and at the other end a platform adapted to receive thereon a photocurable composition, dispensing means for dispensing a liquid photocurable composition to said platform; leveling means for leveling the dispensed liquid composition to a substantially uniform thickness, a pivotally mounted transparency film holder having a substantially flat face adjacent to an image bearing transparency supported thereagainst and positionable over said leveled liquid composition, and means for supplying actinic radiation through said image bearing transparency to the liquid photocurable composition to selectively insolubilize the exposed portions thereof.

3. The apparatus of claim 2 wherein the liquid photocurable composition is received from a continuously recirculating supply to maintain uniformity in the consistency of the liquid photocurable composition.

4. The apparatus of claim 3 wherein the recirculating supply is maintained under vacuum.

5. The apparatus of claim 3 wherein the recirculating supply is heated by a suitable heat source.

6. The apparatus of claim 2 wherein a carriage is included and positionable over said platform, said carriage including liquid photocurable composition dispensing means, leveling means, and a means for directing a stream of heated gas against the liquid photocurable composition over the platform.

7. The apparatus of claim 6 wherein a motor is mechanically engaged to said carriage for positioning over said platform.

8. The apparatus of claim 6 wherein switch means are included for starting and stopping dispensing, and for starting and stopping the stream of heated gas at predetermined positions along said platform.

9. The apparatus of claim 2 wherein a means is included for receiving excess liquid photocurable composition removed by said leveling means.

10. The apparatus of claim 9 wherein a shield is included between said means for receiving excess liquid photocurable composition and said actinic light source to prevent photocuring of excess liquid photocuring composition.

11. The apparatus of claim 2 wherein a means is included to adjust the spaced relationship between the surface of the liquid photocurable composition and the image bearing transparency.

12. The apparatus of claim 2 wherein the platform is heated by a suitable heat source.

13. The apparatus of claim 2 wherein the liquid photocurable composition is received from a supply system which includes a positive displacement pump; a reservoir for storing a supply of liquid photocurable composition; transport means connecting said pump, reservoir, and dispenser; and an automatic control valve means disposed along said transport means for regulating flow and for providing a metered quantity of liquid photocurable composition at desired time intervals.

14. The apparatus of claim 13 wherein the reservoir is heated and equipped with an agitator, degassing vacuum means, recycle lines, and means for resupplying liquid photocurable composition to the system.

15. The apparatus of claim 2 wherein said leveling means is a doctor blade.